United States Patent Office 2,944,364
Patented July 12, 1960

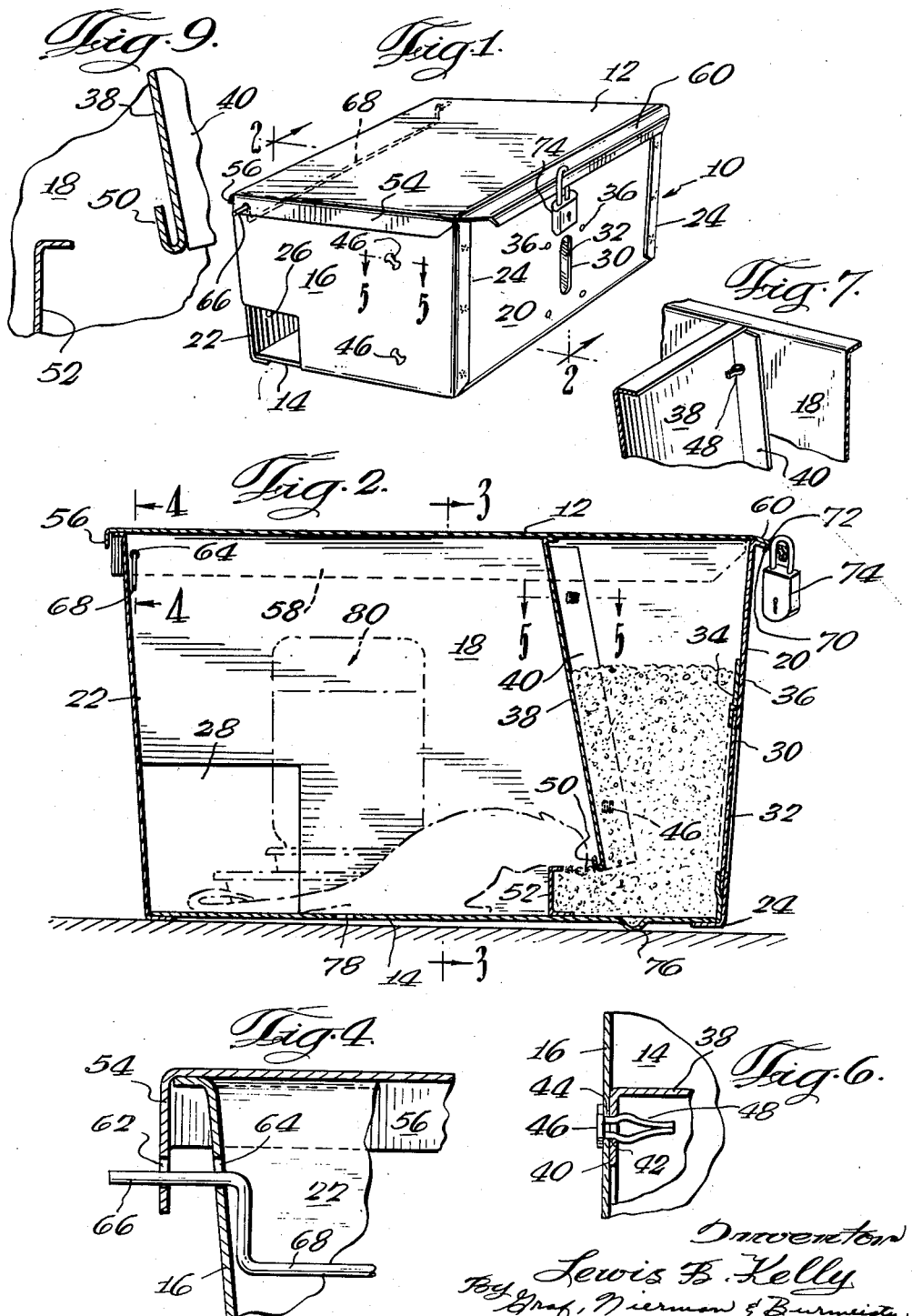

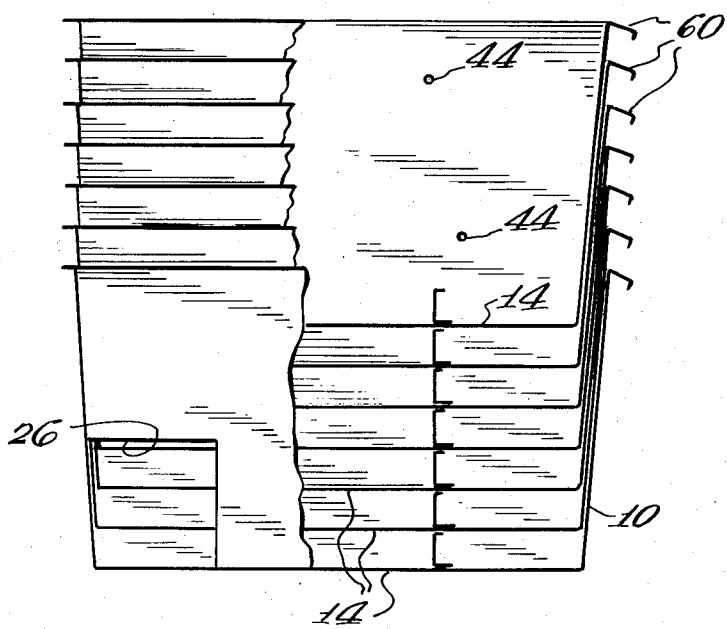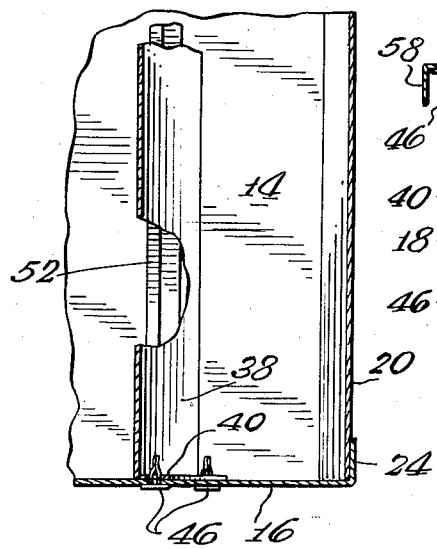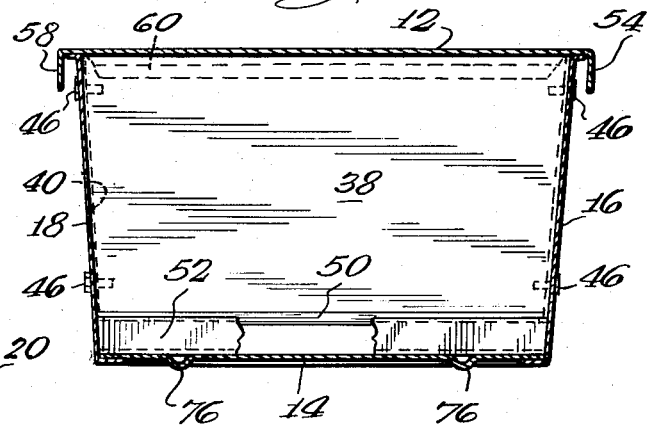

2,944,364

RODENT CONTROL FEEDING STATIONS

Lewis B. Kelly, % Solvit Chemical Co. Inc.,
3734 Speedway Road, Madison, Wis.

Filed Oct. 17, 1956, Ser. No. 616,445

2 Claims. (Cl. 43—131)

This invention relates to an improved structure for devices for the feeding of rodents with rodenticides.

The control of rodents, particularly rats, in residential, farm, commercial and industrial locations is commonly accomplished by disposing in locations infested with rodents foods known to be attractive to the rodents, but incorporating highly toxic elements such as warfarin. In the simplest form of administration of such poisoned foods, the food is merely left in a place known to be frequented by the rodents, either without a container or in an open container such as a dish or pan. Such unprotected disposition of the poisoned food, such as a poisoned grain, is subject to many very serious objections. Perhaps the most serious objection is the accessibility of the poison to domestic animals and children. A further serious objection is that this mode of administration of the poisoned food results in the poison being spread and carried over a large area, thus presenting both an unsightly and an unsafe condition of the location in which the poison is placed. A still further serious objection to this type of administration of the poison is that such a mode of administration requires a compromise between frequent replenishment of the poisoned food (if only small amounts are placed in position at any one time) and rapid impairment of the condition of the food and severe littering of the surrounding location with fragments of the food (if large amounts are positioned at one time). Additionally, such feeding of the poisoned material is completely unsuited for outdoor use.

Accordingly, there have been devised a large variety of structures known as "feeding stations" for the feeding of poisoned foods to rodents. (See, for example, the present inventor's article in Public Works, May, 1952, page 71.) One problem frequently encountered in feeding stations of the prior art is that feeding stations of large food capacity commonly require excessive space in shipping and storage. This problem is particularly acute in the case of users subjected to occasional, but serious, rodent infestations, requiring the use of substantial numbers of stations which must be stored in the periods during which they are not in use, the storage space for such stations constituting a substantial space requirement. In addition, the cost of such stations to the ultimate user is rendered excessively high by the large expense encountered in shipping and handling substantial numbers of such stations by reason of their bulk. Additionally, low cost feeding stations heretofore in use do not adequately make provision for efficient, convenient, and safe use, particularly outdoors.

The present invention provides a rodent feeding station of low cost which combines the desired performance features as regards efficiency, safety, freedom from littering of the adjacent premises, minimizing of the effects of outdoor exposure, and ease of replenishing the supply of poisoned food with a corresponding convenience and conservation of space in shipping, handling, and storage.

For understanding the manner in which the present invention achieves the advantages described above, reference is made to the particular embodiment of the invention illustrated in the drawing, in which:

Figure 1 is a view in perspective of the exterior of the feeding station of the invention;

Figure 2 is a sectional view taken along the line 2—2 of Figure 1 in the direction indicated;

Figure 3 is a sectional view taken along the line 3—3 of Figure 2 in the direction indicated;

Figure 4 is a fragmentary section taken along the line 4—4 of Figure 2 in the direction indicated;

Figure 5 is a fragmentary horizontal sectional view taken along the line 5—5 of Figure 1;

Figure 6 is a fragmentary enlarged sectional view corresponding to a portion of Figure 5;

Figure 7 is a fragmentary enlarged perspective view of a portion of the device;

Figure 8 is a more or less schematic view illustrating the manner in which the main container portion of the device is nested with identical container portions for shipping and storage; and Figure 9 is a fragmentary sectional view constituting an enlarged portion of Figure 2.

The feeding station of the invention consists in general of a main container portion generally designated 10 and a pivoted lid 12 preferably of an inexpensive material such as galvanized sheet-metal.

The main container portion 10 has a bottom panel or floor 14, side panels 16 and 18, and front and rear panels 20 and 22. These panels are provided with suitable angularly bent flaps or extensions 24 spot-welded to respectively adjacent panels to form a generally rectangular enclosure. The side panels 16 and 18 and the front and rear panels 20 and 22 are not, however, perpendicular to the floor 14, being disposed to form obtuse angles therewith. The side panels 16 and 18 are notched or cut away at 26 and 28 to form apertures in the lower rear corners of a size adapted to provide a passage for rodents. The front panel 20 is provided with a central vertical slot 30, a transparent window member 32 being positioned over the slot on the inner surface of the panel, and secured in place by a frame 34 spot-welded at 36 to the inner surface of the panel.

Within the container, a partition member 38 extends across between the side panels 16 and 18, the ends of the partition member 38 having perpendicularly bent flanges 40 each having apertures 42 in register with corresponding apertures 44 in the side panels, the partition member being secured in place, with its upper end extending across the upper portion of the enclosure, by resilient removable fasteners 46 each having a pair of prongs 48 extending through the registered apertures. The partition member is inclined with respect to the bottom panel in the direction opposite the inclination of the front panel. The lower end of the partition member 38 has an upwardly and rearwardly bent extension portion 50.

Rearwardly of the lower end of the partition member 38 is a transverse barrier member 52 extending across the bottom panel and spot-welded to the bottom panel and having a horizontal lip extending forwardly.

The lid 12 has downwardly extending flanges 54, 56, 58 and 60 on all edges thereof, the side flanges 54 and 58 having at the rear ends thereof apertures 62 in register with corresponding apertures 64 in the side panels 16 and 18. Extending through the matching apertures 62 and 64 at each side of the container are the offset ends 66 of a resilient rod 68.

At the upper end of the front panel 20 is a flange 70 formed to match the front flange 60 on the lid 12, both flanges being correspondingly apertured at 72 to accommodate the hasp of a lock 74 provided by the user.

The forward portion of the bottom panel 14 is outwardly dimpled at 76, and the central portion thereof is apertured at 78.

The structure having been thus described, the purpose and advantages of the various features of construction may be readily understood. The feeding station is designed to be placed in a location which is the optimum as regards attraction of rodents. The most efficient place for the location of a feeding station is in the path normally followed by the rodents. With this or any other type of bait feeding, the most advantageous location is against a wall, since it is known that rodent runs are most commonly along inside or outside walls. The apertures in the side walls constitute a natural passage for the rodents when the station is placed against the wall along which rodents are known to run, a clear path of vision through the feeding station thus being provided.

The front panel 20 and the partition member 38, located as described above, form a hopper of funnel-shaped cross-section rearwardly open at the bottom, and the barrier member 52 together with the lower end of the partition 38 form in effect a trough constantly fed by the hopper. As shown in Figure 2, the spacing between the barrier member 52 and the lower end of the partition 38 is sufficient to permit free access by the rodent for the purpose of eating the poisoned food, but is insufficient to permit such unrestricted access to the food as would render it likely that the food will be dug out of the trough in substantial quantities by the paws of the animal. In this connection, the lip or extension 50 at the bottom edge of the partition member 38 serves an important purpose in that it prevents the forepaws of the animal from sliding down in a scratching motion into the food and thus further reduces the likelihood of dispersal of the food, either within the station, or by carrying the food out of the station. The lip on the barrier member 52 acts to scrape off the bulk of the food from a paw which is nevertheless inserted, as the paw is withdrawn, and the thin metal edge also discourages digging motion and thus further reduces the littering of the interior of the station and the surrounding premises.

The lid 12, with its flanges on all sides, permits the use of the station in exposed locations, protecting the contents of the container from rain and ambient contaminants such as mud. The provision of the matching apertures in the front flanges of the lid 12 and the front panel 20 permits locking of the device without introducing any substantial passage for the entrance of deteriorative substances. The window 32 permits visual inspection of the supply of food remaining in the station without the necessity of opening the container. The dimpling of the forward portion of the bottom at 76, forward of the partition 52 produces a slight backward tilt of the station structure when it is placed upon the ground or a floor, thus minimizing the possibility of the presence of standing water, either in the presence of rain, or by reason of accidental spreading of water on the floor of the station from a water feeder placed within the container, such as the chick feeder shown in Figure 2, designated by the numeral 80. The aperture 78 also provides for drainage of the floor.

In addition to the advantages described above as regards efficiency and performance of the feeding station when it is in use, the illustrated embodiment of the invention offers convenience and economy in transportation and storage, both in shipment and at the place of use. The arrangement of the resilient rod 68 having its offset ends 66 seated in the apertures 62 and 64 permits ready installation and removal of the lid 12. By slight bending of the rod 68, the offset ends may be readily removed from the apertures, and the lid thus removed. Since the lid is shallow in depth, the amount of space required by a substantial number of such lids is small. The partition 38 may readily be removed by removal of the fasteners 46, which are disengaged by mere pulling motion, and may be re-used many times. The partition members are likewise shallow in construction and may be stored in a minimum of space. With the lids of the partition members removed, the stations, because of the angular relation of the front, rear and side panels to the floor, may be nested as shown in Figure 8 to permit the storage of a large number in a relatively small space. Thus the illustrated construction results in a great economy of storage and shipping space where substantial numbers of the stations are transported or stored.

In accordance with the patent laws, there is illustrated in the drawing and described above a single embodiment of the invention. Persons skilled in the art will, upon study of the described embodiment, adapt the important novel principles of construction to other rodent feeding stations differing substantially, both in appearance and details of construction, from the illustrated embodiment, but nevertheless achieving the advantages afforded by the invention in the manner basically taught by the invention. Accordingly, the scope of the protection to be afforded the invention should not be limited by the particular embodiment described, but should be determined from the appended claims.

What is claimed is:

1. A rodent control feeding station adapted for nested storage comprising a generally rectangular enclosure having front, rear, and side panels and a bottom panel, the front, rear, and side panels forming obtuse angles with the bottom panel, apertures in the lower rear portions of the side panels of a size adapated to provide a passage for rodents, a vertical window slot in the front panel, a transparent window member, means for securing the window member over the slot, a transverse partition member removable means for securing the partition member between the side panels with its upper end extending across the upper portion of the enclosure and its lower end spaced from the bottom of the enclosure, said partition member having at its lower end an upwardly and rearwardly bent extension portion, and being inclined with respect to the bottom panel in the direction opposite the inclination of the front panel to form a hopper of funnel-shaped cross-section rearwardly open at the bottom, a transverse barrier member extending across the bottom of the enclosure rearwardly of the lower end of the partition member to form a trough fed by the hopper, a lid atop the enclosure having downwardly extending flanges on all edges thereof, correspondingly located apertures in the side flanges of the lid and the side panels of the enclosure, and an elongated resilient member extending transversely of the enclosure and having offset ends seated in said apertures to form a disengagable hinge, the front panel having a flange in abutment against the front flange of the lid, and both of the latter flanges having correspondingly located apertures to accommodate the hasp of a lock.

2. A rodent control feeding station comprising a generally rectangular enclosure having front, rear, and side panels and a bottom panel, apertures in the lower rear corners of the side panels of a size adapted to provide a passage for rodents, support means slightly elevating the front portion of the bottom panel to drain liquids through the apertures, a vertical window slot in the front panel, a transparent window member, means for securing the window member over the slot, a single transverse partition member extending between the side panels with its upper end extending across the upper portion of the enclosure and its lower end spaced from the bottom of the enclosure, said partition member forming with the front panel a hopper rearwardly open at the bottom, a single transverse barrier member extending across the bottom of the enclosure rearwardly of the lower end of the partition member to form a trough fed by the hopper, and a lid pivotally mounted atop the enclosure having downwardly extending flanges on all edges thereof, the single hopper and trough so formed being forward of the passage apertures to provide a clear path of vision through the lower rear portion of the feeding station.

References Cited in the file of this patent

UNITED STATES PATENTS

| | | |
|---|---|---|
| 1,176,243 | Price | Mar. 21, 1916 |
| 1,240,248 | Schoenheit | Sept. 18, 1917 |
| 1,561,644 | Hanson | Nov. 17, 1925 |
| 2,480,724 | Feussner | Aug. 30, 1949 |
| 2,635,382 | Kuntz | Apr. 21, 1953 |
| 2,683,326 | Gardner et al. | July 13, 1954 |
| 2,714,780 | Glover | Aug. 9, 1955 |
| 2,738,914 | Hatch | Mar. 20, 1956 |
| 2,749,881 | Gustafson | June 12, 1956 |
| 2,763,093 | Scott et al. | Sept. 18, 1956 |